June 17, 1930.  U. E. WOOD  1,764,090
ROTARY MOTION CONTROL DEVICE
Filed Aug. 23, 1926
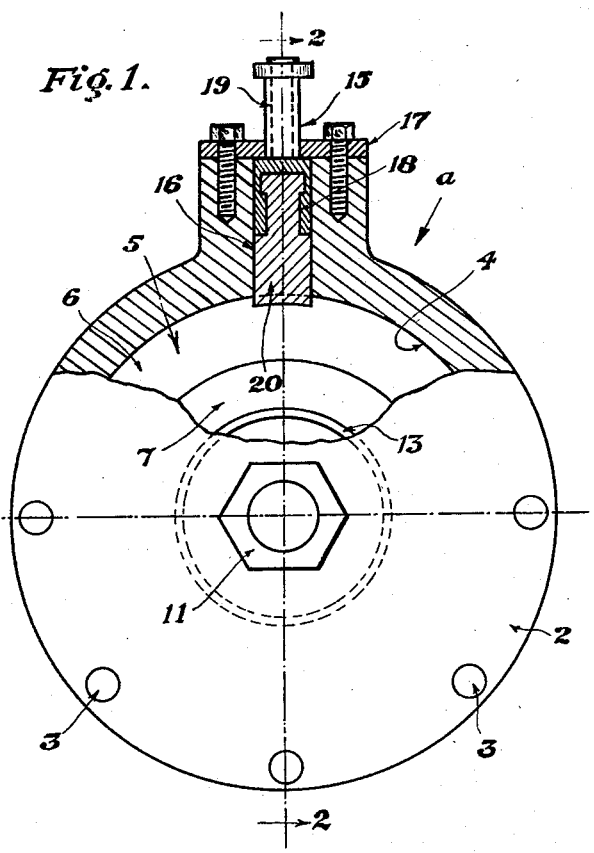
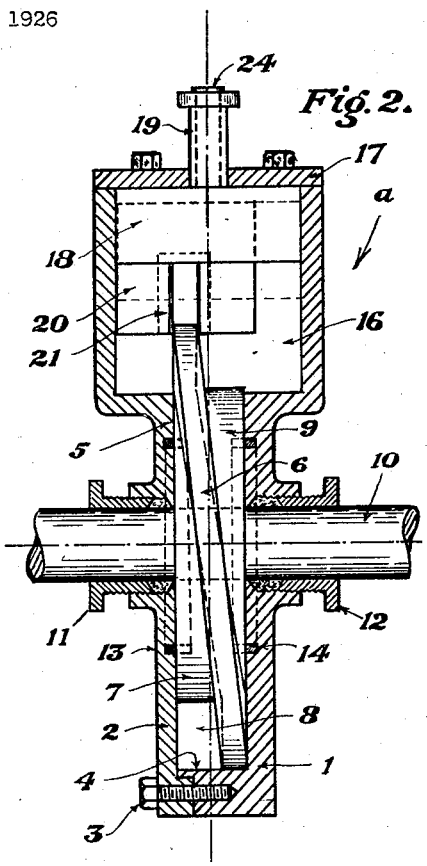
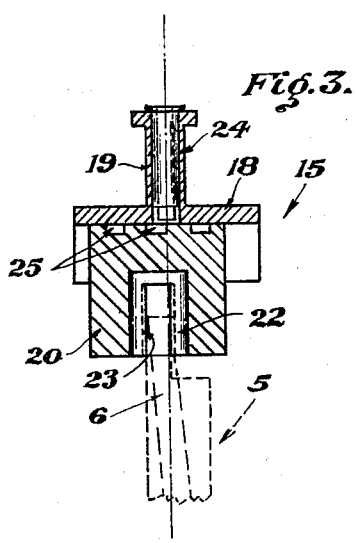
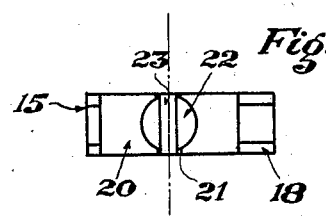
INVENTOR
URAL E. WOOD.
BY
ATTORNEY Patented June 17, 1930

1,764,090

UNITED STATES PATENT OFFICE

URAL E. WOOD, OF LONG BEACH, CALIFORNIA

ROTARY-MOTION-CONTROL DEVICE

Application filed August 23, 1926. Serial No. 130,818.

One object of my invention is to provide a rotary motion control device, which is operated through a single pin projecting from said device.

Another object is to provide a rotary motion control device which is simple in construction, inexpensive to manufacture, and simple in operation.

A feature of my invention resides in controlling the motion, by regulating the opening through which a fluid is forced, by means of a gate cooperating with the fluid driving element.

Other objects, advantages and features of my invention may appear from the accompanying drawing, the subjoined detailed description, the appended claims, or in the operation and use of the device.

In the drawing:

Fig. 1 is a side elevation of my device with parts broken away to show the interior construction.

Fig. 2 is a sectional view taken on line 2—2, Fig. 1.

Fig. 3 is a transverse sectional view of the gate.

Fig. 4 is a bottom plan view of the gate.

Referring more particularly to the drawing, my rotary motion control device a, comprises a stationary case 1, having a cover 2 secured thereto, by cap screws 3, or the like. A circular recess 4 is provided in the case 1 in which a runner 5 is positioned.

The runner 5 consists of a flange 6 which is set at an angle in the recess 4, and the periphery thereof accurately fitting the wall of said recess. The flange 6 extends from a hub 7, which hub, together with the flange and the recess 4, form two substantially wedge-shaped chambers 8—9, one on either side of the flange. At two diametrically opposite points the side faces of the flange 6 is a running fit with the side walls of the recess 4, thus causing the fluid which is placed in the chambers 8—9 to be confined therein. I have discovered that the most practical fluid is a heavy oil, or oil with which cork or the like is mixed; but other fluids may also be used to advantage.

The hub 7 is secured to the shaft 10, the rotation of which is to be controlled, and said shaft being driven from a suitable source of power.

To prevent the possible leakage of fluid around the shaft 10 stuffing boxes 11—12 are provided in the cover 2 and case 1, respectively. To further safeguard against the leakage of fluid past the hub 7, rings 13—14 are provided which rings are set into the hub and the case 1 or cover 2. These rings contract if fluid pressure is applied thereto and thus prevent the escape of said fluid.

A gate 15 is mounted in a transverse slot 16 in the case 1, and the top of said slot is closed by a cover plate 17. This gate comprises a block 18, which is adjustable up or down in the slot 16 by means of a hollow pin 19 extending through the cover 17. A rider 20 is slidably mounted in the block 18 and is provided with a notch 21 which fits over the flange 6. A bushing 22 is journaled in the rider 20 and a slot 23 therein accurately fits the flange 6. Thus it will be seen that as the flange 6 rotates, the bushing 22 can twist slightly in the rider 20 to maintain a seat on the flange. As the shaft 10 rotates, carrying with it the runner 5, the fluid in the chambers 8—9 is forced around by the flange 6 and said flange also oscillates the rider 20. Now it will be seen that if the gate 15 is moved downwardly the passage of the fluid thereunder is constricted, tending to oppose or brake the motion of the shaft 10, such braking being dependent upon the amount of constriction under the gate, and if the gate is moved to its lowest position in which there is no opening thereunder, the runner 5 will be entirely stopped, since the liquid in the chambers 8—9 is incompressible.

By the simple movement of the gate 15 the rotation of the shaft 10 may be regulated.

To positively lock the rider 20, and therefore the runner 5, I provide a spring lock 24 in the pin 19, the plunger of the lock enters one of the notches 25 when in lowered locked position.

It is to be understood that the angularity of the flange 6 may be varied to suit conditions, and also the shape of said flange may be slightly altered; within the scope of my invention.

Having described my invention, I claim:

1. A rotary motion control device comprising a casing, a runner in said casing, a shaft to which said runner is secured, an angularly positioned flange on said runner, said casing having chambers formed therein by said flange, said chambers being adapted to contain a liquid, and means cooperating with said flange whereby the liquid is impeded while being driven by said runner.

2. A rotary motion control device comprising a casing, a runner in said casing, a shaft to which said runner is secured, an angularly positioned flange on said runner, said casing having chambers formed therein by said flange, said chambers being adapted to contain a liquid, a gate in said casing adapted to move up and down to impede the liquid.

3. A rotary motion control device comprising a casing, a runner in said casing, a shaft to which said runner is secured, an angularly positioned flange on said runner, said casing having chambers formed therein by said flange, said chambers being adapted to contain a liquid, a gate in said casing adapted to move up and down to impede the liquid, said gate being provided with a rider adapted to straddle the flange, said rider being slidably mounted in the gate.

4. A rotary motion control device, comprising a casing having a recess and a transverse slot therein, a runner in said recess, an angularly positioned flange on said runner, a shaft secured to said runner, said flange, together with the casing, forming chambers adapted to contain liquid, a gate in said slot, a rider slidably mounted in said gate and adapted to straddle the flange to impede the liquid driven thereby, and a pin extending from said gate whereby the gate may be adjusted.

5. A rotary motion control device comprising a casing, a runner in said casing, a shaft to which said runner is secured, an angularly positioned flange on said runner, said casing having chambers formed therein by said flange, said chambers being adapted to contain a liquid, a gate in said casing adapted to move up and down to impede the liquid, said gate being provided with a rider adapted to straddle the flange, said rider being slidably mounted in the gate, and means to lock the rider in the gate.

6. A rotary motion control device comprising a casing, a runner in said casing, a shaft to which said runner is secured, an angularly positioned flange on said runner, said casing having chambers formed therein by said flange, said chambers being adapted to contain a liquid, a gate in said casing adapted to move up and down to impede the liquid, said gate being provided with a rider adapted to straddle the flange, said rider being slidably mounted in the gate, a bushing in said rider, said bushing having a slot therein to closely fit the flange, and said bushing being journaled in the rider.

7. In a device of the character described, the combination with a stationary housing, of a rotor operably mounted therein and providing a flush chamber therearound, said rotor having a continuous annular vane diagonally disposed with respect to the axis of the rotor, and a movable abutment engaging said vane and operable in a plane paralleling the axis of the rotor.

In testimony whereof, I affix my signature.

URAL E. WOOD.